United States Patent
Huelke et al.

(10) Patent No.: US 9,440,596 B2
(45) Date of Patent: Sep. 13, 2016

(54) RETENTION CLIP FOR INTERIOR VEHICLE COMPONENTS

(71) Applicant: Ford Global Technologies, LLC, Dearborn, MI (US)

(72) Inventors: David Huelke, Milan, MI (US); Mike Popovski, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/548,795

(22) Filed: Nov. 20, 2014

(65) Prior Publication Data

US 2016/0144801 A1    May 26, 2016

(51) Int. Cl.
| | | |
|---|---|---|
| B60R 13/02 | (2006.01) | |
| B60N 3/02 | (2006.01) | |
| F16B 2/24 | (2006.01) | |

(52) U.S. Cl.
CPC .............. *B60R 13/02* (2013.01); *B60N 3/026* (2013.01); *B60R 13/0206* (2013.01); *F16B 2/241* (2013.01)

(58) Field of Classification Search
CPC .............. Y10T 24/304; Y10T 24/307; Y10T 24/44026; Y10T 24/30; Y10T 24/303; Y10T 24/42; B60R 13/0206; B60R 13/04; B60R 13/02; F16B 21/075; F16B 5/0614; F16B 21/241
See application file for complete search history.

(56) References Cited

U.S. PATENT DOCUMENTS

| | | | | |
|---|---|---|---|---|
| 4,925,351 A * | 5/1990 | Fisher | .................... | F16B 37/043 411/182 |
| 5,636,891 A * | 6/1997 | Van Order | ............. | B60N 3/026 224/313 |
| 5,774,949 A * | 7/1998 | Cornell | .................... | F16B 5/123 24/289 |
| 5,919,019 A * | 7/1999 | Fischer | .................. | F16B 37/043 411/112 |
| 6,141,837 A * | 11/2000 | Wisniewski | .......... | F16B 5/0614 24/289 |
| 6,353,981 B1 * | 3/2002 | Smith | ..................... | F16B 2/241 24/289 |
| 6,438,804 B1 * | 8/2002 | Romero Magarino | ........... | B60R 13/0206 24/289 |
| 6,449,814 B1 * | 9/2002 | Dinsmore | ............... | F16B 5/065 24/289 |
| 6,453,522 B1 * | 9/2002 | Romero Magarino | ........... | B60R 13/0206 24/289 |

(Continued)

FOREIGN PATENT DOCUMENTS

| | | |
|---|---|---|
| DE | 202012007754 U1 | 9/2012 |
| WO | 2014062144 A1 | 4/2014 |

*Primary Examiner* — James Ference
(74) *Attorney, Agent, or Firm* — Vichit Chea; Brooks Kushman P.C.

(57) ABSTRACT

A retention clip for an interior vehicle component may include a base and a pair of frame members extending from the base. Each of the frame members may include a primary wing arranged with the base to secure the clip to a sheet metal portion and may have a body including a flared portion partially cutout from the body. The flared portion may define a secondary wing extending from the primary wing and may be configured to contact the metal when the primary wing is dislodged from an installed position. The secondary wings may define distal ends spaced apart from one another at a distance greater than a width of a slot defined by the sheet metal.

15 Claims, 3 Drawing Sheets

(56) References Cited

U.S. PATENT DOCUMENTS

| | | | | |
|---|---|---|---|---|
| 6,527,471 B2* | 3/2003 | Smith | F16B 2/20 | 24/293 |
| 6,606,766 B2* | 8/2003 | Ko | B60J 3/0217 | 24/293 |
| 6,629,809 B2* | 10/2003 | Vassiliou | F16B 37/041 | 411/173 |
| 6,691,380 B2* | 2/2004 | Vassiliou | F16B 5/0614 | 24/289 |
| 6,908,274 B1* | 6/2005 | Vassiliou | F16B 37/02 | 411/173 |
| 6,928,705 B2* | 8/2005 | Osterland | B60R 13/0206 | 24/289 |
| 7,086,125 B2* | 8/2006 | Slobodecki | B60R 13/0206 | 24/293 |
| 7,226,260 B2* | 6/2007 | Jackson, Jr. | F16B 21/076 | 411/112 |
| 7,287,945 B2* | 10/2007 | Lubera | F16B 5/065 | 24/295 |
| 7,320,157 B2* | 1/2008 | Lubera | B60N 3/026 | 24/295 |
| 7,640,635 B2* | 1/2010 | Kim | B60J 3/0213 | 24/295 |
| 7,900,953 B2* | 3/2011 | Slobodecki | B60R 13/0206 | 24/293 |
| 8,316,513 B2* | 11/2012 | DeJong | F16B 5/065 | 24/293 |
| 8,646,155 B2* | 2/2014 | Ribes Marti | F16B 2/241 | 24/295 |
| 8,677,573 B2* | 3/2014 | Lee | B60R 13/0206 | 24/289 |
| 2001/0032377 A1* | 10/2001 | Lubera | B60N 3/026 | 24/293 |
| 2001/0046426 A1* | 11/2001 | Lubera | B60N 3/026 | 411/182 |
| 2002/0164200 A1* | 11/2002 | Wisniewski | B60R 13/0206 | 403/220 |
| 2002/0194710 A1* | 12/2002 | Dickinson | F16B 5/0614 | 24/295 |
| 2004/0083582 A1* | 5/2004 | Dickinson | F16B 5/0614 | 24/295 |
| 2005/0105987 A1* | 5/2005 | Giugliano | F16B 5/065 | 411/508 |
| 2005/0217082 A1* | 10/2005 | Vassiliou | F16B 5/0614 | 24/294 |
| 2005/0236861 A1* | 10/2005 | Slobodecki | B60R 13/0206 | 296/39.1 |
| 2008/0028577 A1* | 2/2008 | Soman | F16B 21/075 | 24/293 |
| 2008/0084050 A1* | 4/2008 | Volkmann | B60R 21/213 | 280/728.2 |
| 2008/0086850 A1* | 4/2008 | Smith | B60R 13/0206 | 24/289 |
| 2008/0286066 A1* | 11/2008 | Paquet | F16B 37/043 | 411/177 |
| 2008/0309115 A1* | 12/2008 | Nakajima | B60J 3/0221 | 296/97.9 |
| 2009/0205174 A1* | 8/2009 | Slobodecki | B60R 13/0206 | 24/458 |
| 2010/0026028 A1* | 2/2010 | Smith | B60R 13/0206 | 296/29 |
| 2011/0163562 A1* | 7/2011 | Smith | B60R 13/0206 | 296/1.07 |
| 2011/0169295 A1* | 7/2011 | Huelke | F16B 5/0628 | 296/97.11 |
| 2011/0209309 A1 | 9/2011 | Camus | | |
| 2012/0125960 A1* | 5/2012 | Diez Herrera | F16B 37/043 | 224/309 |
| 2012/0305724 A1* | 12/2012 | Diez Herrera | F16B 21/075 | 248/231.81 |
| 2014/0047679 A1* | 2/2014 | Lepper | F16B 5/0657 | 24/453 |

* cited by examiner

RETENTION CLIP FOR INTERIOR VEHICLE COMPONENTS

TECHNICAL FIELD

The present disclosure relates to retention clips for securing interior vehicle components, such as handles and hooks.

BACKGROUND

Clips and fasteners are used to join various interior vehicle components to trim, panels, and/or underlying sheet metal of a vehicle. The clips and fasteners are required to withstand a certain amount of stress and force to ensure the vehicle components remain joined to the respective trim, panels, and/or sheet metal. Under certain conditions, such as air bag deployment, stresses and forces may deform portions of the clips and fasteners. This deformation may be such that the clips and fasteners fall through the trim or panel into a cabin of the vehicle. As a result, the vehicle component may also become dislodged.

SUMMARY

An interior vehicle component retention clip includes a base and a pair of frame members extending from the base. Each of the frame members includes a primary wing arranged with the base to secure the clip to a sheet metal portion and has a body including a flared portion partially cutout from the body. The flared portion defines a secondary wing extending from the primary wing and is configured to contact the metal when the primary wing is dislodged from an installed position. The secondary wings may define distal ends spaced apart from one another at a distance greater than a width of a slot defined by the sheet metal sized for at least a portion of the clip to extend therethrough. The clip may include a pair of arms extending from the base and defining distal ends located above a receiving aperture defined by the base, and the arms may be configured to at least partially retain a fastener extending through the aperture. An upper portion of each of the frame members may include an overlap flange configured to overlap the other frame member and to dictate a flex limit of each of the frame members. The base may define a plurality of base flanges arranged to grip flanges of the primary wings to secure the clip to the portion of sheet metal in the installed position. The base flanges may be arranged with the secondary wings to prevent the clip from passing through a slot defined by the sheet metal when the primary wings are dislodged from the installed position. The interior vehicle component may be a grab handle or coat hook.

A retention clip to mount an interior component of a vehicle includes a base portion, a pair of flexible frame members, and dual clips. The base portion defines a plurality of base flanges. The pair of flexible frame members extends from the base and each have an overlap flange at an upper portion arranged with one another to overlap the other frame member. The dual clips each have a primary wing with a grip flange arranged with the base flanges to receive a portion of sheet metal therebetween and a body including a flared portion partially cutout of the body and extending outward to define a secondary wing. The wings are arranged with one another such that the secondary wings contact a portion of the sheet metal when the primary wings are dislodged from an installed position. The portion of sheet metal may define a slot for at least a portion of the clip to extend through, and the secondary wings may define distal ends spaced apart from one another a distance greater than a width of the slot. A pair of arms may extend from the base portion to distal ends located above a receiving aperture defined by the base portion sized to receive a fastener. The overlap flanges may be arranged with the flexible frame members to dictate an extent to which the flexible frame members flex. The interior component may be a grab handle or coat hook.

An assembly to support an interior handle of a vehicle includes a portion of sheet metal defining an open slot, and a retention clip. The retention clip extends through the slot and includes a primary wing and base flanges disposed on either side of the metal to hold the clip in an installed position. The retention clip includes a secondary wing extending from the primary wing such that the secondary wing contacts the metal when the primary wing is not in contact with the metal to prevent the clip from passing completely through the slot. The assembly may include a component spacer including a fastener sized to extend through a receiving aperture defined by a base portion of the clip, and the interior handle and the component spacer may be arranged on opposite sides of a headliner of the vehicle. The clip may further include a pair of arms extending from the base portion and each having distal ends configured to grasp the fastener. The assembly may further include a frame member to support the primary wing, and may be configured to flex during installation of the clip. An upper portion of the frame member may further include an overlap flange. The overlap flange may be arranged with another overlap flange to dictate an extent of the frame member flex during installation. The secondary wing may define a distal end spaced apart from another distal end of another secondary wing at a distance greater than a length of a width of the slot.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
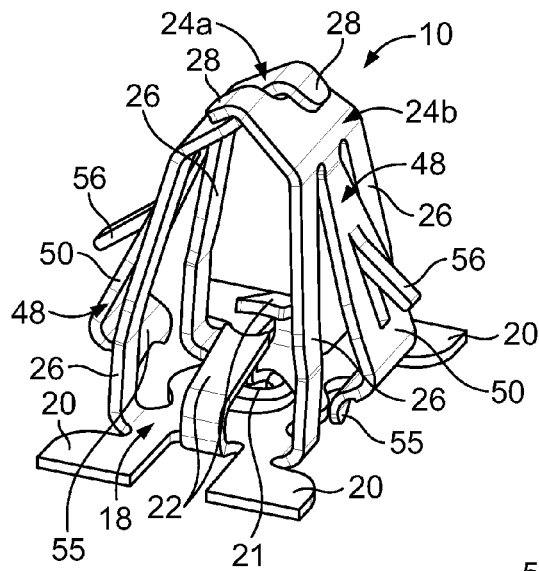
FIG. 1 is a perspective view of a retention clip for an interior vehicle component of a vehicle.
Figure 2:
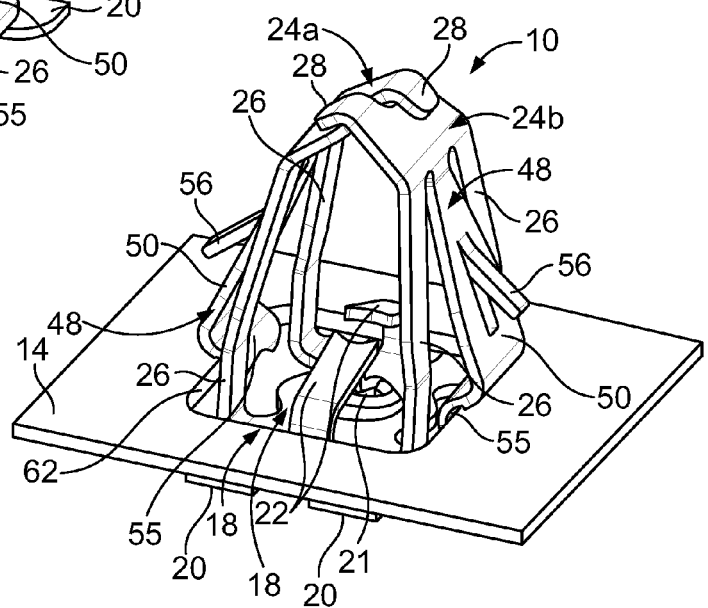
FIG. 2 is a perspective view of the retention clip of FIG. 1 shown in an installed position on a portion of sheet metal.
Figure 3:
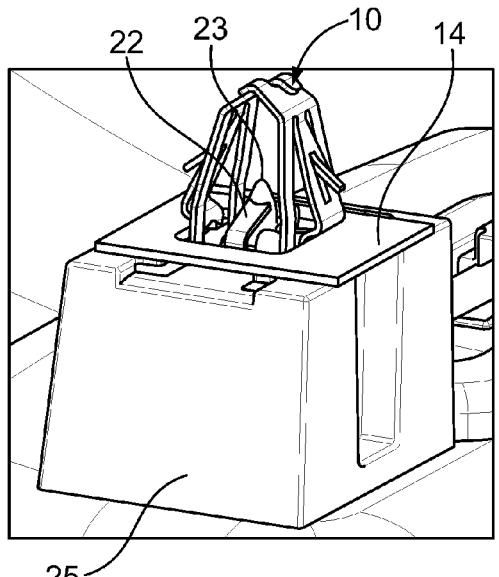
FIG. 3 is a perspective view of the retention clip of FIG. 1 shown arranged with a component spacer and the portion of sheet metal of FIG. 2.

Referring to FIGS. 1 and 2, an example of a retention clip 10 is illustrated. The retention clip 10 may assist in retaining an interior vehicle component, such as a grab handle or coat hook, to a portion of sheet metal 14 of a vehicle. The portion of sheet metal 14 is representative of various location of the vehicle. While the portion of the sheet metal 14 is shown as a fragmentary square-shaped portion, the portion of the sheet metal 14 is representative of various portions of sheet metal on the vehicle and is not meant to limit the scope of the disclosure herein. In the example of associating the retention clip 10 with the grab handle or coat hook, the portion of sheet metal 14 may be, for example, a roof portion, a header portion, or a grab handle bracket portion of the vehicle. The retention clip 10 includes a base plate 18 defining a plurality of base flanges 20. The base flanges 20 may contact the portion of the sheet metal 14 to prevent the retention clip 10 from passing completely through a receiving slot 19 which is defined by the portion of the sheet metal 14. The base plate 18 may define a receiving aperture 21 sized to receive various types of fasteners. A pair of arms 22 may extend from the base plate 18 to distal ends located above the receiving aperture 21. In one example, a fastener 23 may extend through the receiving aperture 21 such that the distal ends of the arms 22 contact and partially retain the fastener 23 as shown in FIG. 3. The fastener 23 may be secured to a component spacer 25. The component spacer 25 may be, for example, a spacer for the interior vehicle component.

A pair of frame members 24 may include pillar segments 26 which extend from the base plate 18. The frame members 24 may be referred to as frame member 24a and frame member 24b or collectively referred to as the frame members 24 herein. Each of the frame members 24 may include an overlap flange 28 at an upper portion of the frame members 24. The overlap flanges 28 may be arranged relative to one another such that a portion of each overlap flange 28 overlaps onto the opposing frame member 24a or 24b, respectively. This overlapping arrangement of the overlap flanges 28 may dictate an amount of movement or flex of the frame members 24 during, for example, insertion of a portion of the retention clip 10 through the receiving slot 19.

Figure 4:
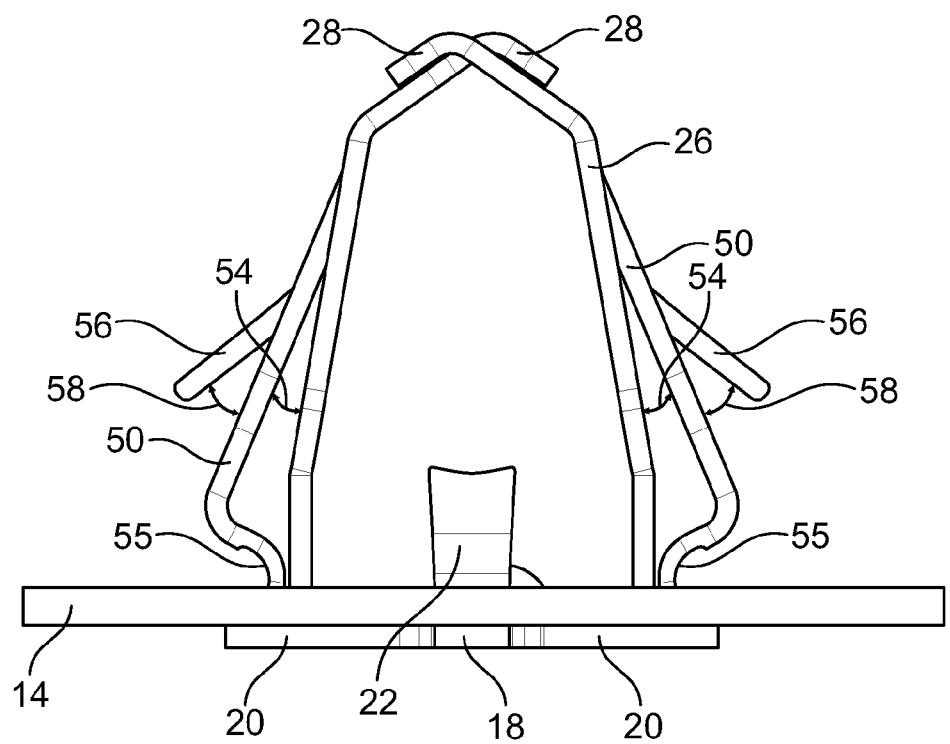
FIG. 4 is a front view of the retention clip of FIG. 1 showing a pair of primary wings and a base portion arranged with one another to secure the retention clip to a portion of sheet metal.
Figure 5:
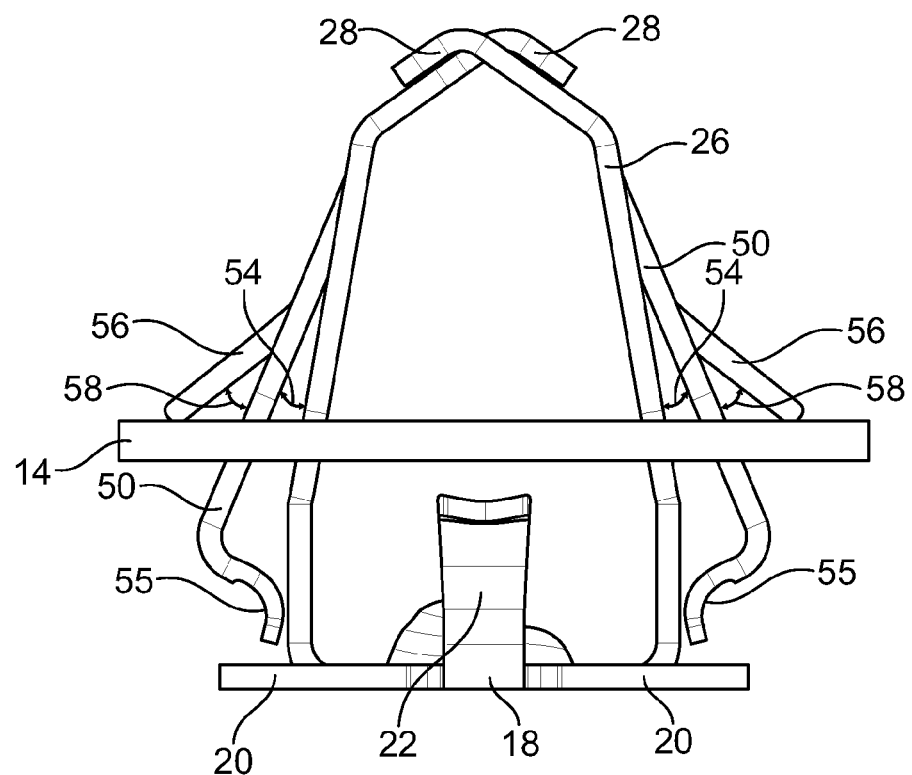
FIG. 5 is a front view of the retention clip of FIG. 1 showing a pair of secondary wings contacting a portion of sheet metal.

Referring now additionally to FIGS. 4 and 5, each of the frame members 24 includes a dual wing clip 48 having a primary wing 50 extending from the upper portion of the frame members 24 at a first angle 54 relative to the respective pillar segments 26. A grip flange 55 is included at distal ends of each of the primary wings 50. A secondary wing 56 extends from each of the primary wings 50 at an angle 58 relative to the respective primary wing 50. The primary wing 50 may include flexing characteristics to assist in installing the retention clip 10 to the sheet metal 14. For example, the primary wings 50 may flex toward one another due to contact with the sheet metal 14 when the retention clip 10 is inserted into the receiving slot 19 defined by the sheet metal 14. It is contemplated that the primary wings 50 may be a single component.

FIG. 4 shows an example of a first position of the retention clip 10 in which the grip flanges 55 are compressed against the sheet metal 14 to assist in retaining and orienting the retention clip 10 in the first position. The first position may also be referred to as an installed position herein. FIG. 5 shows an example of a second position of the retention clip 10 in which grip flanges 55 have lost contact with the sheet metal 14 such that the retention clip 10 moves out of the first position. The second position may also be referred to as a dislodged position herein. The retention clip 10 may move to the second position under certain conditions or events. For example, in the event an air bag is deployed which is located proximate the retention clip 10, the force of the air bag deployment may impact surrounding components such as the retention clip 10 and cause the grip flanges 55 to lose contact with the sheet metal 14 such that the retention clip 10 moves from the installed position to the dislodged position. In another example, a force may be applied to the retention clip 10 which may deform the primary wings 50 such that the grip flanges 55 no longer contact the portion of the sheet metal 14. In the dislodged position, the secondary wings 56 contact the portion of the sheet metal 14 to prevent the retention clip from slipping through the receiving slot 19 of the sheet metal 14. The secondary wings 56 may define distal ends spaced apart from one another. The distal ends of the secondary wings 56 may be spaced apart from each other at a distance which is greater than a width of the receiving slot 19. Thus, the secondary wings 56 may act as a backup to the primary wings 50 to prevent the retention clip 10 from falling into a cabin of the vehicle under certain conditions.

Figure 6:
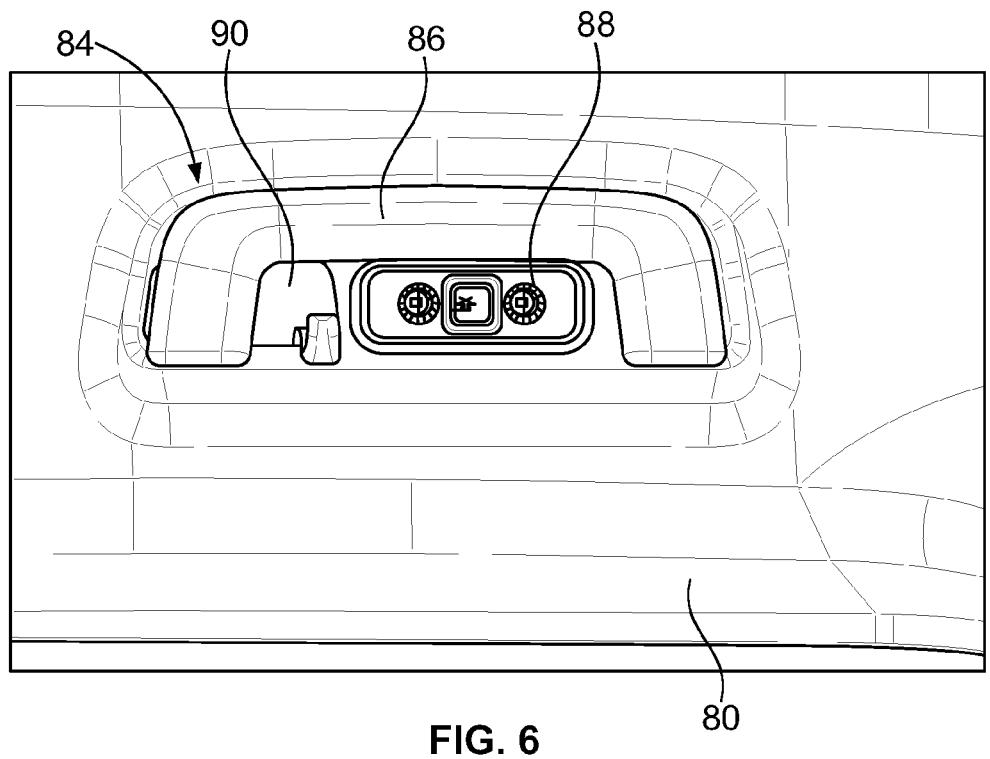
FIG. 6 is a perspective view of an interior portion of a vehicle showing interior components secured at a headliner portion of the vehicle.
Figure 7:
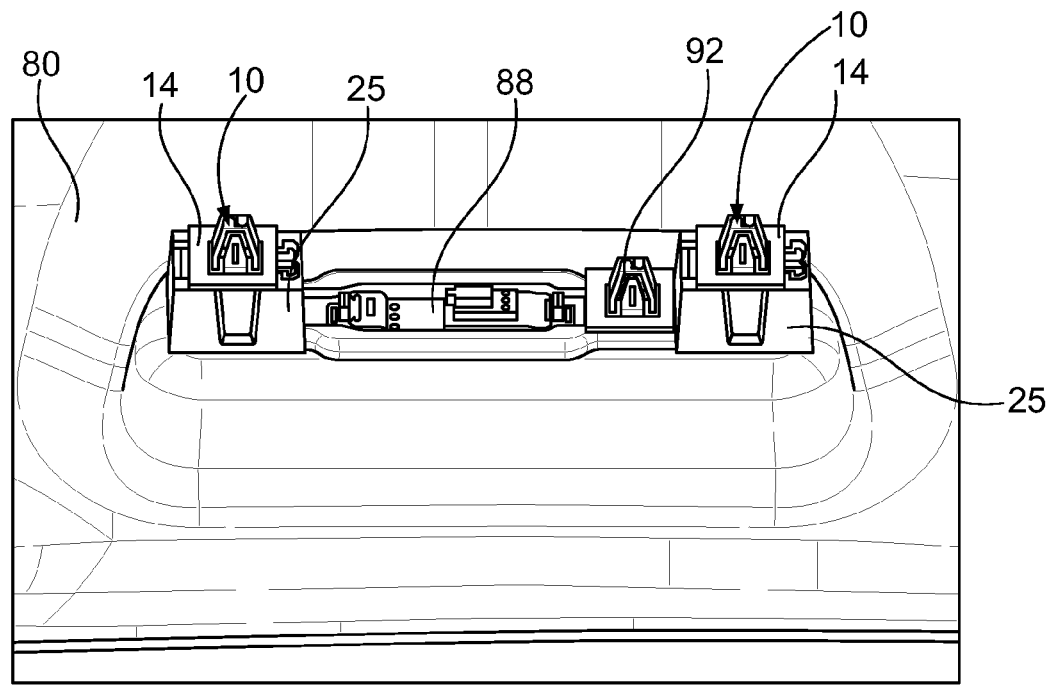
FIG. 7 is a perspective view of the other side of the headliner portion of FIG. 6 showing the interior components secured thereto via three of the retention clips of FIG. 1.

FIGS. 6 and 7 show an example of an environment in which the retention clip 10 may be mounted. FIG. 6 is an illustrative view from an interior of a vehicle cabin including a headliner 80. In this example, the headliner 80 includes a recessed portion 84. A grab handle 86, a lamp 88, and a coat hook 90 are at least partially disposed within the recessed portion 84. FIG. 7 is an illustrative view from another side of the headliner 80 showing three of the retention clips 10. The component spacer 25 is shown installed between the headliner 80 and the portion of the sheet metal 14. In this example, two of the fasteners 23 extend from the grab handle 86 and are secured to the respective retention clips 10 in the first position. Another fastener 92 extends from the coat hook 90 and is secured to another of the retention clips 10 and is also in the first position. As described above, in the event that a force or other action dislodges the retention clips 10 from the installed position, the secondary wings 56 will contact the respective portions of the portion of the sheet metal 14 to prevent each of the retention clips 10, the grab handle 86, and the coat hook 90 from falling into the vehicle cabin.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An interior vehicle component clip comprising:
   a base; and
   a first frame member and a second frame member each extending from the base, a portion of the first frame member arranged to overlap the second frame member and partially cover an angled upper portion of the second frame member, a portion of the second frame member arranged to overlap the first frame member and partially cover an angled upper portion of the first frame member, each of the first and second frame members including a primary wing arranged with the base to secure the clip to a sheet metal part and a secondary wing extending from the primary wing oriented for non-contact with the sheet metal part in an installed position;

wherein the base comprises a plurality of base flanges and each of the primary wings comprises a grip flange arranged with the base flanges to secure the clip to the sheet metal part in the installed position; and wherein the base flanges are arranged with the secondary wings to prevent the clip from passing through a slot in the sheet metal part when the primary wings are dislodged from the installed position.

2. The clip of claim 1, wherein the secondary wings each define distal ends spaced apart from one another at a distance greater than a width of a slot defined by the sheet metal part sized for at least a portion of the clip to extend therethrough.

3. The clip of claim 1, further comprising a pair of arms each extending from the base and each defining distal ends located above a receiving aperture defined by the base, wherein the arms are configured to at least partially retain a fastener extending through the aperture.

4. The clip of claim 1, wherein the angled upper portions of each of the first and second frame members are arranged with one another to dictate a flex limit of each of the frame members.

5. The clip of claim 1, wherein the interior vehicle component clip is operably connected to a grab handle or a coat hook.

6. A retention clip to mount an interior component of a vehicle comprising:

a base comprising a plurality of base flanges;

first and second flexible frame members extending from the base, each of the first and second flexible frame members having an overlap flange at an angled upper portion, wherein the overlap flange of the first flexible frame member overlaps the angled upper portion of the second flexible frame member and the overlap flange of the second flexible frame member overlaps the angled upper portion of the first flexible frame member; and dual clips each having a primary wing with a grip flange arranged with the base flanges to receive a portion of a sheet metal part therebetween and a body including a flared portion partially cutout of the body and extending outward to define a secondary wing, wherein the primary wings and the secondary wings are arranged with one another such that the secondary wings do not contact a portion of the sheet metal part when the primary wings are in an installed position;

wherein the portion of the sheet metal part defines a slot for at least a portion of the clip to extend through; and wherein the base flanges are arranged with the secondary wings to prevent the clip from passing through a slot in the sheet metal part when the primary wings are dislodged from the installed position.

7. The clip of claim 6, wherein the secondary wings each define distal ends spaced apart from one another a distance greater than a width of the slot.

8. The clip of claim 7, further comprising a pair of arms extending from the base to distal ends located above a receiving aperture defined by the base sized to receive a fastener.

9. The clip of claim 6, wherein the overlap flanges are arranged with the first and second flexible frame members to dictate an extent to which the first and second flexible frame members flex.

10. The clip of claim 6, wherein the interior component is a grab handle or a coat hook.

11. An assembly to support an interior handle of a vehicle comprising:

a portion of a sheet metal part defining an open slot having two sides;

a retention clip extending through the slot and including a primary wing and base flanges arranged with the portion of the sheet metal part for compression against the sides of the open slot to hold the clip in an installed position, and a secondary wing extending from the primary wing such that the secondary wing is spaced from the portion of the sheet metal part and such that when the primary wing is not in contact with the sheet metal part, the secondary wing prevents the clip from passing completely through the slot;

first and second frame members configured to support the primary wing and flex during installation of the clip and each of the frame members including an angled upper portion and an overlap flange, wherein the overlap flange of the first frame member overlaps and at least partially covers the angled upper portion of the second frame member, and wherein the overlap flange of the second frame member overlaps and at least partially covers the angled upper portion of the first frame member; and wherein the primary wing comprises a grip flange arranged with the base flanges to secure the clip to the sheet metal part in the installed position.

12. The assembly of claim 11, further comprising a component spacer including a fastener sized to extend through a receiving aperture defined by a base portion of the clip, and wherein the interior handle and the component spacer are arranged on opposite sides of a headliner of the vehicle.

13. The assembly of claim 12, wherein the clip further includes a pair of arms extending from the base portion and having distal ends configured to grasp the fastener.

14. The assembly of claim 11, wherein the overlap flanges are arranged with one another to dictate an extent of the flex of the first and second frame members during installation.

15. The assembly of claim 11, wherein the secondary wing defines a distal end spaced apart from a distal end of another secondary wing at a distance greater than a length of a width of the slot.

* * * * *